UNITED STATES PATENT OFFICE.

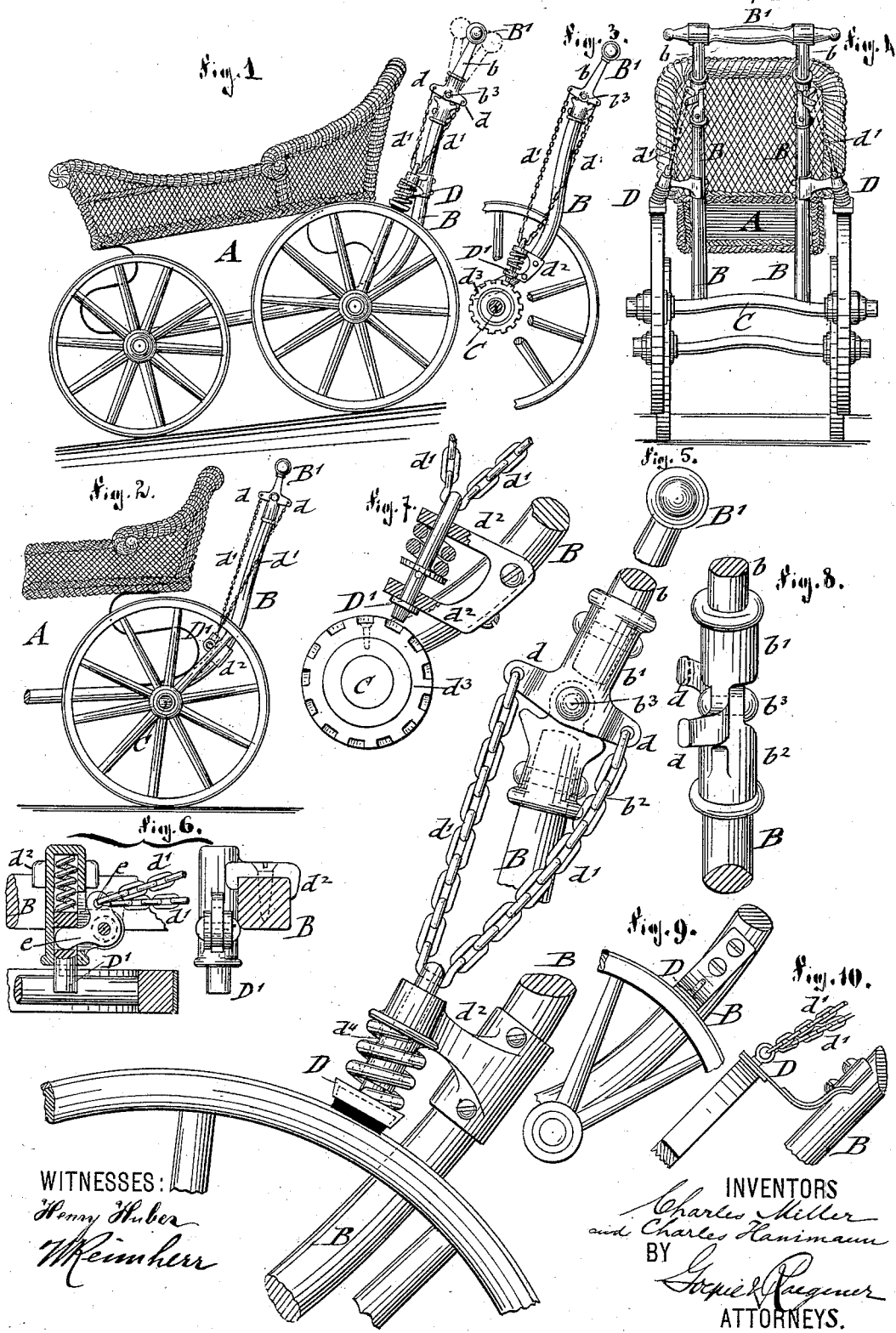

CHARLES MILLER, OF BROOKLYN, AND CHARLES HANIMANN, OF NEW YORK, N. Y.

BRAKE FOR CHILDREN'S CARRIAGES.

SPECIFICATION forming part of Letters Patent No. 422,245, dated February 25, 1890.

Application filed August 6, 1889. Serial No. 319,886. (No model.)

*To all whom it may concern:*

Be it known that we, CHARLES MILLER, of Brooklyn, county of Kings, and State of New York, and CHARLES HANIMANN, of the city, county, and State of New York, both citizens of the United States, have invented certain new and useful Improvements in Automatic Brakes for Children's Carriages, of which the following is a specification.

This invention relates to an improved automatic brake for children's carriages, by which the carriage is prevented from moving when not propelled, so that the frequent accidents arising from the starting and upsetting of children's carriages when not held are prevented.

The invention consists of a child's carriage in which the transverse handle-bar is pivoted to the upright supporting-bars and adapted to release a spring-actuated brake or stop device from the hind wheels or axle whenever the carriage is propelled, but which brake or stop device is automatically applied when the handle is released, so that the carriage is prevented from moving.

In the accompanying drawings, Figures 1 and 2 represent side elevations of a child's carriage with our improved brake for arresting the same when not propelled. Fig. 3 is a sectional side elevation of a portion of the carriage, showing a modified construction of the brake or stop device. Fig. 4 is a rear elevation of the carriage shown in Fig. 1. Fig. 5 is a side view of the brake device shown in Fig. 1 and drawn on a larger scale. Figs. 6 and 7 are details of the brake or stop device shown, respectively, in Figs. 2 and 3, also drawn on a larger scale. Fig. 8 is a detail side view showing the pivotal connection of the transverse handle-bar with the supporting-uprights on the same, and Figs. 9 and 10 are respectively detail views of still another modification of the brake device.

Similar letters of reference indicate corresponding parts.

Referring to the drawings, A represents a child's carriage of any approved construction, and B the supporting-uprights of the handle-bar B', which are attached to the hind axle C in the usual manner. The transverse handle-bar B', instead of being rigidly connected to the uprights B, is pivoted by its shanks $b$ to the upper ends of the uprights B, the pivotal connection being accomplished by means of sockets $b'$ $b^2$, which are attached to the ends of the shanks $b$ and uprights B. The sockets $b'$ $b^2$ are provided with flat overlapping ends, which are connected by a pivot $b^3$. The upper sockets $b'$ of the uprights B are provided with laterally-extending crank-arms $d$, which are connected by chains $d'$ with spring-actuated brakes D, which are applied either to the tires of the hind wheels, as shown in Figs. 1, 4, 5, 9, and 10, or the brakes may be made in the nature of spring-actuated stops D', which are guided in brackets or keepers $d^2$ of the uprights B and adapted to engage the spokes of the hind wheels, as shown in Fig. 2, or ratchet-wheels $d^3$ on the hind axle, as shown in Figs. 3 and 7. The brake D (shown in Fig. 5) is guided in a bracket $d^2$, attached to the upright B and actuated by a spiral spring $d^4$, interposed between said bracket and the shoe of the brake B. When the hind wheels are engaged by a spring-actuated stop D', the same are actuated by fulcrumed bell-crank levers, to which the chains $d'$ $d'$ are connected, and which engage a recess of the slide-stop D', as shown in Fig. 6. In the modification shown in Figs. 9 and 10 the bracket $d^2$ and spiral spring $d^4$ are dispensed with and the brake applied to the tire by means of a band-spring, which is attached to the upright B and the brake-shoe, it being released by the connecting-chains $d'$ in the same manner as in other constructions shown.

When the child's carriage is in its normal position of rest, the brakes D are applied to the tires of both hind wheels by the action of their springs, as shown in Fig. 1, the action of the springs also exerting a tension on the connecting-chains, so as to hold the shanks of the handle-bar B' in their normal position in line with the uprights B. When, however, the carriage is to be moved in forward or backward direction, the handle-bar B' is taken hold of and either pushed forward or pulled backward, in which case one of the connecting-chains $d'$ acts on one of the crank-arms $d$ and withdraws thereby the brake instantly from the tire of the wheel, so as to permit the easy forward or backward movement of the carriage. The modified constructions of the brake are operated in an analogous manner, the carriage being stopped when not propelled by the handle-bar, as the stop devices either engage the spokes of the hind wheels or the ratchet-wheels on the hind axle. The stop devices are released so as to permit the moving of the carriage in either direction whenever the handle-bar is taken hold of and moved in forward or backward direction out of its normal position of rest. By the automatic action of the brake or stop device the carriage is stopped as soon as the handle-bar is released and thereby the starting of the same on an inclined pavement is prevented, so that the frequently-occurring accidents owing to the carelessness and negligence of the nurses are effectually avoided, while the carriage is always retained in position of rest without requiring the holding of the same while the child is placed into the body of the carriage or removed therefrom.

Having thus described our invention, we claim as new and desire to secure by Letters Patent—

1. The combination of a child's carriage, upright bars attached to the axle of the same, a transverse handle-bar pivoted to said upright bars, a spring-actuated brake or stop device, and intermediate connecting mechanism between the handle-bar and brake or stop device, whereby the handle-bar may be moved in either direction to effect a release, substantially as set forth.

2. The combination, with a child's carriage, of upright supporting-bars, a transverse handle-bar having shanks pivoted to the upper ends of said upright bars, said shanks being provided with crank-arms, spring-actuated brakes or stop devices supported on the uprights, and connecting-chains between said crank-arms and the brake or stop devices, substantially as set forth.

3. The combination, with the wheels of a child's carriage, of upright bars attached to the axle of the same, a transverse handle-bar having shanks pivoted to the upper ends of the upright bars, crank-arms on said shanks, spring-actuated brakes supported on the uprights and applied to said wheels, and chains connecting the crank-arms of the handle-bar with the shanks of the brake-shoes, substantially as set forth.

In testimony that we claim the foregoing as our invention we have signed our names in presence of two subscribing witnesses.

CHARLES MILLER.
CHARLES HANIMANN.

Witnesses:
PAUL GOEPEL,
W. REIMHERR.